United States Patent
Yao et al.

(10) Patent No.: US 11,838,903 B2
(45) Date of Patent: Dec. 5, 2023

(54) METHOD, NETWORK DEVICE AND TERMINAL DEVICE FOR MANAGING A RESOURCE IN A WIRELESS COMMUNICATION SYSTEM

(71) Applicant: Telefonaktiebolaget LM Ericsson (PUBL), Stockholm (SE)

(72) Inventors: Yong Yao, Nanjing (CN); Liye Xu, Nanjing (CN); Yanyan Ding, Nanjing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 310 days.

(21) Appl. No.: 17/262,837

(22) PCT Filed: Jul. 31, 2019

(86) PCT No.: PCT/CN2019/098697
§ 371 (c)(1),
(2) Date: Jan. 25, 2021

(87) PCT Pub. No.: WO2020/038204
PCT Pub. Date: Feb. 27, 2020

(65) Prior Publication Data
US 2023/0144736 A1 May 11, 2023

(30) Foreign Application Priority Data
Aug. 24, 2018 (WO) ................ PCT/CN2018/102245

(51) Int. Cl.
*H04W 72/0457* (2023.01)
*H04W 72/542* (2023.01)
(52) U.S. Cl.
CPC ..... *H04W 72/0457* (2023.01); *H04W 72/542* (2023.01)

(58) Field of Classification Search
CPC ........................ H04W 72/0457; H04W 72/542
See application file for complete search history.

(56) References Cited

U.S. PATENT DOCUMENTS

2013/0163492 A1 6/2013 Wong
2019/0021045 A1* 1/2019 Kim ..................... H04W 48/12
(Continued)

FOREIGN PATENT DOCUMENTS

CN 101510851 A 8/2009
CN 107613478 A 1/2018

OTHER PUBLICATIONS

3GPP TS 38.211 v15.1.0; Technical Specification; 3rd Generation Partnership Project; Technical Specification Group Access Network; NR; Physical channel and modulation (Release 15)—Mar. 2018.
3GPP TS 38.212 v15.1.1; Technical Specification; 3rd Generation Partnership Project; Technical Specification Group Radio Access Network; NR; Multiplexing and channel coding (Release 15)—Apr. 2018.

(Continued)

*Primary Examiner* — Maharishi V Khirodhar
*Assistant Examiner* — Kenneth P Hunt
(74) *Attorney, Agent, or Firm* — Christopher & Weisberg, P.A.

(57) ABSTRACT

Method, network device and terminal device for managing a resource in a wireless communication system are disclosed. A method may comprise determining a virtual bandwidth part, V-BWP, for a terminal device; and indicating the V-BWP to the terminal device, wherein the V-BWP comprises two or more bandwidth parts and any active bandwidth part of the V-BWP can be deactivated.

16 Claims, 11 Drawing Sheets

(56) References Cited

U.S. PATENT DOCUMENTS

| | | | |
|---|---|---|---|
| 2020/0021407 A1* | 1/2020 | Abdoli | H04L 5/001 |
| 2020/0220700 A1* | 7/2020 | Wu | H04W 72/23 |
| 2020/0266958 A1* | 8/2020 | Liu | H04L 5/0092 |
| 2020/0274678 A1* | 8/2020 | Lin | H04L 5/0092 |

OTHER PUBLICATIONS

3GPP TS 38.213 v15.1.0; Technical Specification; 3rd Generation Partnership Project; Technical Specification Group Radio Access Network; NR; Physical layer procedures for control (Release 15)—Mar. 2018.
3GPP TS 38.214 v15.1.0; Technical Specification; 3rd Generation Partnership Project; Technical Specification Group Radio Access Network; NR; Physical layer procedures for data (Release 15)—Mar. 2018.
3GPP TS 38.321 v 15.1.0; Technical Specification; 3rd Generation Partnership Project; Technical Specification Group Radio Access Network; NR; Medium Access Control (MAC) protocol specification (Release 15)—Mar. 2018.
3GPP TS 38.331 v15.1.0; Technical Specification; 3rd Generation Partnership Project; Technical Specification Group Radio Access Network; NR; Radio Resource Control (RRC) protocol specification (Release 15)—Mar. 2018.
PCT Notification of Transmittal of the International Search Report and the Written Opinion of the Internatinoal Searching Authority, or the Declaration issued for PCT/CN2019/098697—dated Oct. 15, 2019.

\* cited by examiner

METHOD, NETWORK DEVICE AND TERMINAL DEVICE FOR MANAGING A RESOURCE IN A WIRELESS COMMUNICATION SYSTEM

PRIORITY

This nonprovisional application is a U.S. National Stage Filing under 35 U.S.C. § 371 of International Patent Application Serial No. PCT/CN2019/098697 filed Jul. 31, 2019 and entitled "Method, Network Device and Terminal Device for Managing a Resource in a Wireless Communication System" which claims priority to International Patent Application Serial No. PCT/CN2018/102245 filed Aug. 24, 2018 both of which are hereby incorporated by reference in their entirety.

TECHNICAL FIELD

Embodiments of the disclosure generally relate to wireless communication, and, more particularly, to method, network device and terminal device for managing a resource in a wireless communication system.

BACKGROUND

Fifth generation (5G) wireless access is being developed with at least three use case families: enhanced mobile broadband (eMBB), massive machine-type communications (mMTC) and ultra-reliable low-latency communications (URLLC). eMBB may focus on across-the-board enhancements to the data rate, latency, user density, capacity and coverage of mobile broadband access. mMTC may be designed to enable communication between devices that are low-cost, massive in number and battery-driven, intended to support applications such as smart metering, logistics, and field and body sensors. URLLC may make it possible for devices and machines to communicate with ultra-reliability, very low latency and high availability, making it ideal for vehicular communication, industrial control, factory automation, remote surgery, smart grids and public safety applications. To meet the complex and sometimes contradictory requirements of these diverse use cases, 5G may encompass both an evolution of Fourth generation (4G) networks and an addition of a new, globally standardized radio access technology known as New Radio (NR).

In order to cater for different requirements, the 5G network can partition radio resources such that each set of radio resources can meet the requirements of a given service by using different physical layer configurations. In 5G network, there may be two or more numerologies each of which may correspond to one subcarrier spacing in frequency domain and/or cyclic prefix (CP) parameter. Comparing to Long Term Evolution (LTE) numerology, a difference is that the NR may support multiple different types of subcarrier spacing while in LTE there is only one type of subcarrier spacing, i.e., 15 Khz. For example, multiple OFDM numerologies are supported as given by Table 4.2-1 of TS 38.211-f20 of 3rd Generation Partnership Project (3GPP), where $\mu$ and the cyclic prefix for a bandwidth part (BWP) may be obtained from a higher-layer parameter subcarrierSpacing and cyclicPrefix, respectively.

TABLE 4.2-1

Supported transmission numerologies.

| $\mu$ | $\Delta f = 2^{\mu} \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

As can be seen from Table 4.2-1, each numerology is labeled as a parameter $\mu$. The numerology ($\mu$=0) represents 15 kHz which is same as LTE. And in the second column, the subcarrier spacing of other $\mu$ is derived from ($\mu$=0) by scaling up in the power of 2.

As defined in subclause 4.4.5 of 3GPP TS 38.211-f20, a BWP is a subset of contiguous common resource blocks for a given numerology $\mu_i$ in bandwidth part i on a given carrier. A user equipment (UE) can be configured with up to four BWPs in the downlink with a single downlink BWP being active at a given time. A UE can be configured with up to four BWPs in the uplink with a single uplink BWP being active at a given time.

SUMMARY

This summary is provided to introduce a selection of concepts in a simplified form that are further described below in detailed description. This summary is not intended to identify key features or essential features of the claimed subject matter, nor is it intended to be used to limit the scope of the claimed subject matter.

According to a first aspect of the disclosure, it is provided a method implemented in a network device of a wireless communication system. The method comprises determining a virtual bandwidth part, V-BWP, for a terminal device. The method further comprises indicating the V-BWP to the terminal device. The V-BWP comprises two or more bandwidth parts and any active bandwidth part of the V-BWP can be deactivated.

In an embodiment, the method may further comprise transmitting to the terminal device a message for activating or deactivating at least one of the two or more bandwidth parts.

In an embodiment, the activation or deactivation of the at least one of the two or more bandwidth parts may be based on respective channel variance of the two or more bandwidth parts, Channel State Information, CSI, report, control channel element, CCE, capacity, and/or data volume requirement of the terminal device.

In an embodiment, the message may include a duration of the activation or deactivation of the at least one of the two or more bandwidth parts determined by the network device.

In an embodiment, the indication and/or the message may be transmitted via at least one of a radio resource control, RRC, message, a Media Access Control control-element, MAC CE.

In an embodiment, the terminal device may monitor Physical Downlink Control Channel, PDCCH, of all the activated bandwidth parts.

In an embodiment, the terminal device's measurement density of the activated bandwidth part, the deactivated bandwidth part, and a candidate bandwidth part outside the V-BWP may be set as different.

In an embodiment, control information of the two or more bandwidth parts may be transmitted/received in a selected active bandwidth part of the V-BWP.

In an embodiment, the selected active bandwidth part may be the bandwidth part with the best channel quality.

In an embodiment, the control information may comprise scheduling information and/or channel state information and/or hybrid automatic repeat request, HARQ, indicator.

In an embodiment, each of the two or more bandwidth parts may be associated with respective timer and when all timers of the two or more bandwidth parts inside the V-BWP expire, the terminal device is triggered to enter a default bandwidth part.

In an embodiment, when the V-BWP is setup up for the terminal device, the bandwidth parts inside the V-BWP may be active by default.

In an embodiment, the V-BWP may comprise two or more bandwidth parts with a same numerology and/or cyclic prefix, CP, parameter.

In an embodiment, the two or more bandwidth parts may belong to a same cell.

According to a second aspect of the disclosure, it is provided a method implemented in a terminal device of a wireless communication system. The method comprises receiving, from a network device, an indication of a virtual bandwidth part, V-BWP. The method further comprises determining the V-BWP from the indication. The V-BWP comprises two or more bandwidth parts and any active bandwidth part of the V-BWP can be deactivated.

In an embodiment, the method may further comprise receiving from the network device, a message for activating or deactivating at least one of the two or more bandwidth parts. The method further comprises activating or deactivating the at least one of the two or more bandwidth parts.

In an embodiment, the activation or deactivation of the at least one of the two or more bandwidth parts may be based on respective channel variance of the two or more bandwidth parts, Channel State Information, CSI, report, control channel element, CCE, capacity, and/or data volume requirement of the terminal device.

In an embodiment, the message may include a duration of the activation or deactivation of the at least one of the two or more bandwidth parts determined by the network device.

In an embodiment, the indication and/or the message may be received via at least one of a radio resource control, RRC, message, a Media Access Control control-element, MAC CE.

In an embodiment, the terminal device may monitor Physical Downlink Control Channel, PDCCH, of all the activated bandwidth parts.

In an embodiment, the terminal device's measurement density of the activated bandwidth part, the deactivated bandwidth part, and a candidate bandwidth part outside the V-BWP may be set as different.

In an embodiment, control information of the two or more bandwidth parts may be transmitted/received in a selected active bandwidth part of the V-BWP.

In an embodiment, the selected active bandwidth part may be the bandwidth part with the best channel quality.

In an embodiment, the method may further comprise detecting control information of the two or more bandwidth parts from all the active bandwidth parts blindly.

In an embodiment, the control information may comprise scheduling information and/or channel state information and/or hybrid automatic repeat request, HARQ, indicator.

In an embodiment, each of the two or more bandwidth parts may be associated with respective timer and when all timers of the two or more bandwidth parts expire, the terminal device is triggered to enter a default bandwidth part.

In an embodiment, when the V-BWP is setup up for the terminal device, the bandwidth parts inside the V-BWP may be active by default.

In an embodiment, the two or more bandwidth parts may belong to a same cell and/or the V-BWP comprises two or more bandwidth parts with a same numerology and/or cyclic prefix, CP, parameter.

According to a third aspect of the disclosure, it is provided a network device of a wireless communication system. The network device comprises a processor; and a memory, the memory containing instructions executable by the processor, whereby the network device is operative to determine a virtual bandwidth part, V-BWP, for a terminal device, The network device is further operative to indicate the V-BWP to the terminal device. The V-BWP comprises two or more bandwidth parts and any active bandwidth part of the V-BWP can be deactivated.

According to a fourth aspect of the disclosure, it is provided a terminal device of a wireless communication system. The terminal device comprises a processor; and a memory, the memory containing instructions executable by the processor, whereby the terminal device is operative to: receive, from a network device, an indication of a virtual bandwidth part, V-BWP. The terminal device is further operative to determine the V-BWP from the indication. The V-BWP comprises two or more bandwidth parts and any active bandwidth part of the V-BWP can be deactivated.

According to a fifth aspect of the disclosure, it is provided a computer program product storing instructions which when executed by at least one processor, cause the at least one processor to perform the method according to the first aspect of the disclosure.

According to a sixth aspect of the disclosure, it is provided a computer program product storing instructions which when executed by at least one processor, cause the at least one processor to perform the method according to the second aspect of the disclosure.

According to a seventh aspect of the disclosure, it is provided a computer readable storage medium storing instructions which when executed by at least one processor, cause the at least one processor to perform the method according to the first aspect of the disclosure.

According to an eighth aspect of the disclosure, it is provided a computer readable storage medium storing instructions which when executed by at least one processor, cause the at least one processor to perform the method according to the second aspect of the disclosure.

According to a ninth aspect of the disclosure, it is provided a method implemented in a communication system including a host computer, a network device and a terminal device. The method may comprise at the host computer, receiving user data originating from a transmission from a terminal device to a network device. The network device is operative to configured to perform the method according to the first aspect of the disclosure. The terminal device is operative to configured to perform the method according to the second aspect of the disclosure.

According to a tenth aspect of the disclosure, it is provided a method implemented in a communication system including a host computer, a network device and a terminal device. The method may comprise at the host computer, initiating a transmission carrying user data to the terminal device via the network device. The network device is operative to configured to perform the method according to the first aspect of the disclosure. The terminal device is operative to configured to perform the method according to the second aspect of the disclosure.

According to an eleventh aspect of the disclosure, it is provided a communication system including a host computer comprising: a processing circuitry configured to provide user data; and a communication interface configured to receive user data originating from a transmission from a terminal device to a network device. The network device comprises a processor and a memory, the memory containing instructions executable by the processor, whereby the network device is operative to configured to perform the method according to the first aspect of the disclosure. The terminal device comprises a processor and a memory, the memory containing instructions executable by the processor, whereby the terminal device is operative to configured to perform the method according to the second aspect of the disclosure.

According to a twelfth aspect of the disclosure, it is provided a communication system including a host computer comprising: a processing circuitry configured to provide user data; and a communication interface configured to initiate a transmission carrying user data to a terminal device via a network device. The network device comprises a processor and a memory, the memory containing instructions executable by the processor, whereby the network device is operative to configured to perform the method according to the first aspect of the disclosure. The terminal device comprises a processor and a memory, the memory containing instructions executable by the processor, whereby the terminal device is operative to configured to perform the method according to the second aspect of the disclosure.

According to a thirteenth aspect of the disclosure, it is provided a network device. The network device may comprise a determining unit configured to determine a virtual BWP, V-BWP, for a terminal device. The network device may further comprise an indicating unit configured to indicate the V-BWP to the terminal device. The V-BWP comprises two or more BWPs and any active BWP of the V-BWP can be deactivated.

According to a fourteenth aspect of the disclosure, it is provided a terminal device. The terminal device may comprise a receiving unit configured to receive, from a network device, an indication of a virtual bandwidth part, V-BWP. The terminal device may further comprise a determining unit configured to determine the V-BWP from the indication. The V-BWP comprises two or more BWPs and any active BWP of the V-BWP can be deactivated.

Some embodiments of the present disclosure can support intra cell carrier aggregation of BWPs, and the complexity and overhead of scheduling and signal process flow may be reduced compared to inter cell carrier aggregation. Some embodiments of the present disclosure can support a high data rate. Some embodiments of the present disclosure can enable power savings via dynamic activation or deactivation of BWPs inside the V-BWP. Some embodiments of the present disclosure can avoid wastage of the radio resources by optimal resource allocation. Some embodiments of the present disclosure can prevent a BWP blockage issue which hinders scheduling of services. Some embodiments of the present disclosure can support consistent numerology based aggregation, which may reduce the complexity and/or cost of UE. Some embodiments of the present disclosure can support a uniform scheduler instead of multiple schedulers for covering the V-BWP traffic scheduling for a UE. Some embodiments of the present disclosure can support equalization design for the BWPs inside the V-BWP, which may fully adapt channel variance.

DETAILED DESCRIPTION

Figure 1:
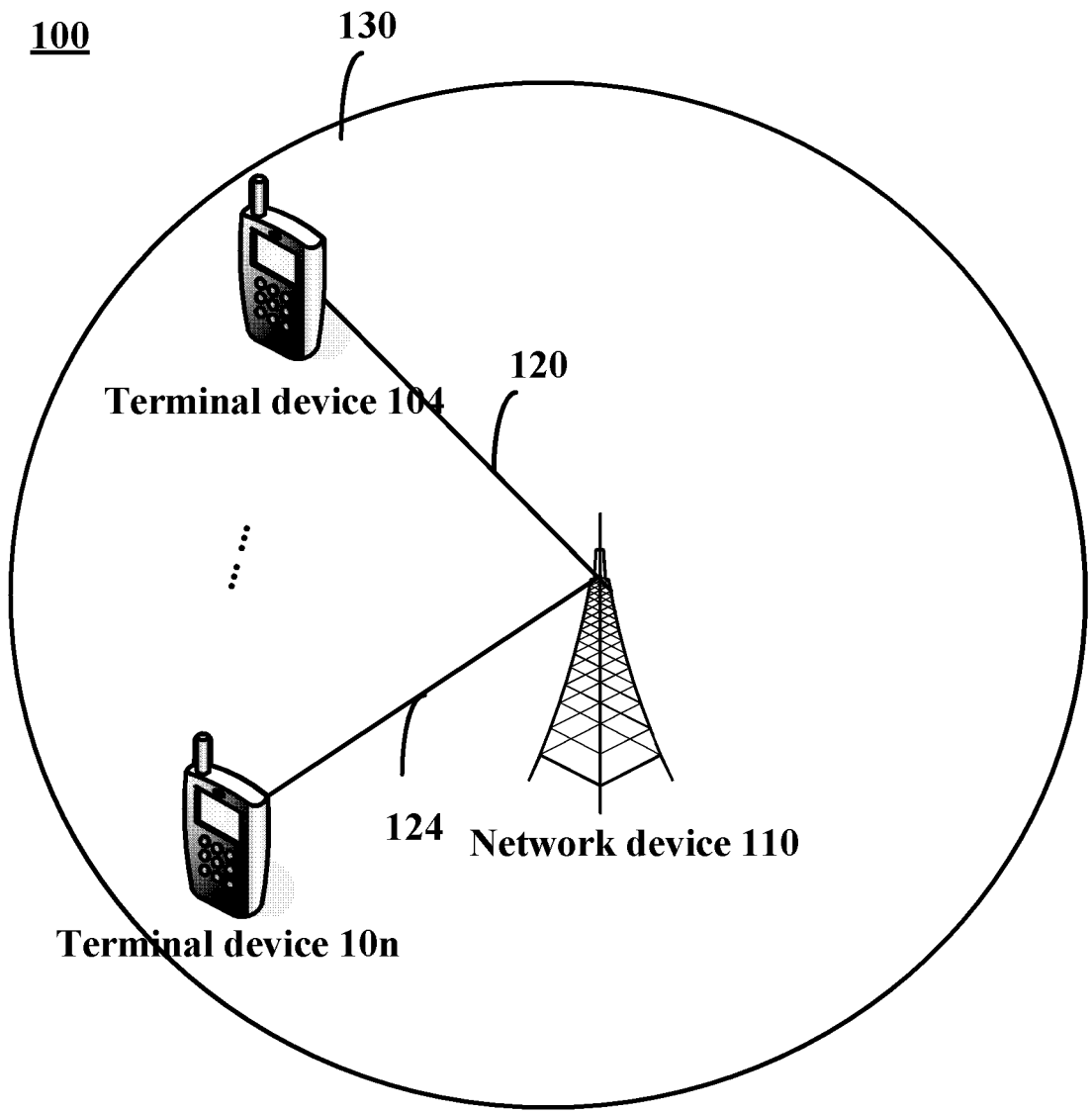
FIG. 1 depicts a schematic communication system, in which some embodiments of the present disclosure can be implemented.

For the purpose of explanation, details are set forth in the following description in order to provide a thorough understanding of the embodiments disclosed. It is apparent, however, to those skilled in the art that the embodiments may be implemented without these specific details or with an equivalent arrangement.

As used herein, the term "wireless communication network" or "wireless network system" refers to a network supporting numerology and BWP, such as 5G NR. Furthermore, the communications between a terminal device and a network device in the wireless communication network may be performed according to any suitable generation communication protocols such as 5G communication protocols and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The terminal device may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP such as 5G NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

In the following description and claims, unless defined otherwise, all technical and scientific terms used herein have the same meaning as commonly understood by one of ordinary skills in the art to which this disclosure belongs.

As described above, a UE can be configured with up to four BWPs in the downlink with a single downlink BWP being active at a given time. A UE can be configured with up to four BWPs in the uplink with a single uplink BWP being active at a given time. However single active BWP may be not enough for some service such as eMBB. Therefore it is desired to address the above mentioned disadvantages or other shortcomings or at least provide a useful alternative.

Embodiments herein disclose a network device for managing a resource in a wireless communication system. The network device may include a resource controller coupled to a memory and a processor. The resource controller may be configured to allocate the resource for a data transmission for a terminal device as a) determining a virtual BWP, V-BWP, for a terminal device; and indicate the V-BWP to the terminal device. The V-BWP may comprise two or more BWPs. Any active BWP of the V-BWP can be deactivated.

Unlike methods of the related art, some embodiments of the present disclosure can aggregate two or more BWPs together which is referred to as virtual BWP (V-BWP), and UE throughput could be increase greatly based on BWP aggregation. Some embodiments of the present disclosure can support intra cell carrier aggregation of BWPs, and the complexity and overhead of scheduling and signal process flow may be reduced compared to inter cell carrier aggregation. Some embodiments of the present disclosure can support a high data rate. Some embodiments of the present disclosure can enable power savings via dynamic activation or deactivation of BWPs inside the V-BWP. Some embodiments of the present disclosure can avoid wastage of the radio resources by optimal resource allocation. Some embodiments of the present disclosure can prevent a numerology blockage issue which hinders scheduling of services. Some embodiments of the present disclosure can support consistent numerology based aggregation, which may reduce the complexity and/or cost of UE. Some embodiments of the present disclosure can support a uniform scheduler instead of multiple schedulers for covering the V-BWP traffic scheduling for a UE. Some embodiments of the present disclosure can support equalization design for the BWPs inside the V-BWP, which may fully adapt channel variance. Since no primary cell role and secondary cell role among the BWPs inside V-BWP, the responsibility taken by each BWP may depend on the channel quality and/or scheduling capacity in some embodiments of the present disclosure.

It is noted that though the embodiments are mainly described in the context of the 5G NR system, they are not limited to this but can be applied to any suitable wireless system supporting BWP. Now some exemplary embodiments of the present disclosure will be described below with reference to the figures.

FIG. 1 depicts a schematic communication system, in which some embodiments of the present disclosure can be implemented. As shown in FIG. 1, the communication system 100 comprises a network device 110 such as a base station (BS), for example a gNB in NR. The network device 110 may refer to a function element on the network side as compared to a terminal device or UE. For example, the network device 110 may comprise a gNB, a Home gNB, a femto Base Station, a pico BS, or any other node capable to serve terminal devices 104-10n in the system 100. It is well known that a cellular radio system may comprise a network of radio cells each served by a transmitting station, known as a cell site or base transceiver station. The radio network provides wireless communications service for a plurality of transceivers. The network of network devices working in collaboration allows for wireless service which is greater than the radio coverage provided by a single network device. The individual network device may be connected by another network (in many cases a wired network, not shown), which includes additional functionality and in some cases access to other network systems (such as the Internet) or metropolitan area networks (MANs). The circle 130 schematically indicates a coverage range of the network device 110.

As shown in FIG. 1, the communication system 100 may comprise one or more UEs or terminal devices 104-10n, each of which may operably communicate with the network device 110 such as a cellular base station through a wireless link, such as link 120 and 124. The terminal devices 104-10n can be fixed or moveable. Terminal devices 104-10n may include, but not limited to, cellular telephones, smart phones, and computers, whether desktop, laptop, or otherwise, as well as mobile devices or terminals such as cellular network UEs, machine type communication devices, handheld computers, personal digital assistants (PDAs), wireless sensors, wearable devices, video cameras, set-top boxes, personal media devices, or any combinations of the foregoing, which may be provided with wireless communication functionality and run with any kind of operating system including, but not limited to, Windows, Linux, UNIX, Android, iOS and their variants. The terminal devices 104-10n may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like. The terminal devices 104-10n may be compliant with multiple, different communication protocols that can operate as a multi-mode device by communicating within the communication system 100.

In addition, though only one network device 110 is shown in FIG. 1, there may be two or more network devices such that some terminal devices are within the coverage range of first network device, some terminal devices are within the coverage range of second network device, and some terminal devices are at the border of the coverage ranges of two or more network devices, and so on. In the latter case, the terminal devices may receive signals from each of the two or more network devices.

Figure 2:
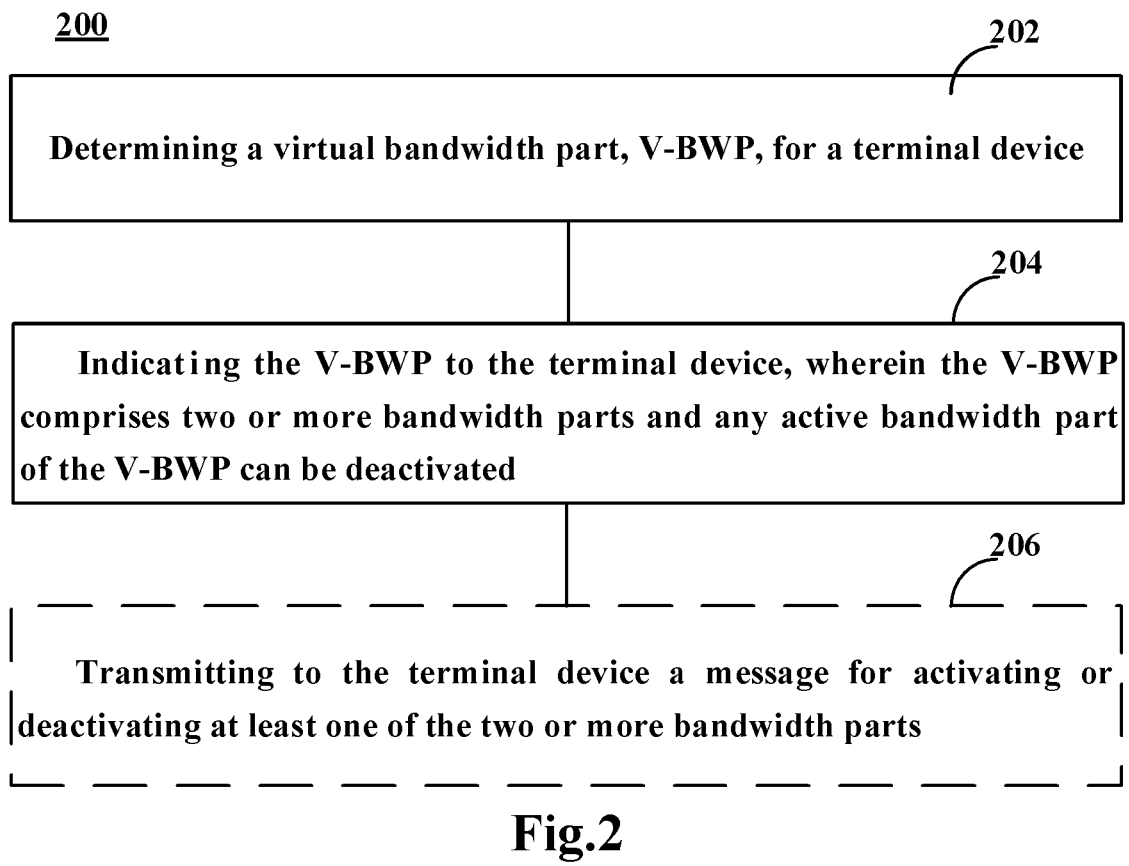
FIG. 2 is a flow chart depicting a method implemented in a network device of a wireless communication system according to an embodiment of the present disclosure.

FIG. 2 is a flow chart depicting a method implemented in a network device of a wireless communication system according to an embodiment of the present disclosure, which may be performed at an apparatus such as the network device 110 of FIG. 1. As such, the network device 110 may provide means for accomplishing various parts of the method 200 as well as means for accomplishing other processes in conjunction with other components. The wireless communication system may be NR or other suitable wireless network supporting BWP.

As shown in FIG. 2, the method 200 may start at block 202 where the network device 110 may determine a V-BWP for a terminal device. The V-BWP may comprise two or more BWPs. The number of BWPs within the V-BWP may depend on various factors such as channel variance and/or capacity and/or data volume requirement of the UE, etc. In an embodiment, the two or more BWPs may be with a same numerology parameter and/or cyclic prefix (CP) parameter, i.e., it can support consistent numerology based aggregation, which may reduce the complexity and/or cost of UE. The two or more BWPs may be located at any suitable locations of a carrier. The two or more BWPs may be contiguous or discontinuous.

In an embodiment, the two or more BWPs may belong to a same cell. In this way, BWP aggregation is an intra cell carrier aggregation, and the complexity and overhead of scheduling, signal process flow may be reduced compared to inter cell carrier aggregation. Moreover one uniform scheduler instead of multiple schedulers may cover the V-BWP traffic scheduling for a UE.

The network device 110 may determine the V-BWP for the terminal device such as UE in various ways. In an embodiment, the network device 110 may determine the V-BWP for the UE based on various factors such as the channel variance and/or capacity and/or data volume requirement of the UE. For example, the network device 110 may determine the V-BWP for the UE based on the channel variance. The V-BWP may comprise BWPs with a high channel quality. When the data volume requirement of the UE is high, the V-BWP may comprise more BWPs. When the capacity of the UE is strong, the V-BWP may comprise more BWPs.

In an embodiment, more than one V-BWP may be configured to a UE for traffic flow, which may be based on the UE's capability. For example, In a 5G system, it would be possible for a UE to access multiple services concurrently, hence the network device 110 may determine respective V-BWP for the one or more services of the UE such that different V-BWPs can be operated efficiently by the UE without hampering any of the service requirements. In addition, uplink and downlink V-BWP can be determined separately.

In an embodiment, an initial access BWP may be used to trigger the V-BWP activation. The initial BWP may be put into the V-BWP by default. If no V-BWP is activated, then the network device and the terminal device may follow a legacy behavior.

At block 204, the network device 110 may indicate the V-BWP to the terminal device. The network device 110 may indicate the V-BWP to the terminal device in various ways such as explicitly and implicitly. For example, the network device 110 may transmit, to the terminal device, a message for indicating the V-BWP. The message may be included in any suitable message or a dedicated message. In an embodiment, the message may be transmitted via a radio resource control (RRC) message or Media Access Control control-element, MAC CE, or any other suitable message. The message may comprise any suitable information for indicating the V-BWP such as the identity of the V-BWP. In addition, the network device 110 may indicate the V-BWP to the terminal device in any suitable implicit ways.

In an embodiment, when the V-BWP is setup up for the terminal device, the BWPs inside the V-BWP may be active by default. In an embodiment, any active BWP of the V-BWP can be deactivated. For example, in order to fully adapt channel variance, there is no primary cell role and secondary cell role among the BWPs inside V-BWP and the responsibility taken by each BWP inside V-BWP may depend on various factors such as the channel quality, scheduling capacity, etc. In general, all the BWPs inside the VBWP may be considered as equal. The BWP to be used for UE control plane may not be static, which may be UE specific and/or channel quality or scheduling capacity dependent, no primary or secondary role is defined for BWPs inside the V-BWP. In this way, any active BWP of the V-BWP can be deactivated. In other embodiments, when the V-BWP is setup up for the terminal device, the network device may indicate which BWP(s) inside the V-BWP is active. V-BWP is different from carrier aggregation (CA), since V-BWP does not have anchor role and is allowed to deactivate the whole V-BWP. In this embodiment, it can support equalization design for the BWPs inside the V-BWP, which may fully adapt channel variance.

In an embodiment, the network device 110 may schedule at least one resource block (RB) within one or more active BWPs of the V-BWP. For example, the network device 110 may schedule at least one RB within one or more active BWPs of the V-BWP for the terminal device based on data volume requirement of the UE. Since two or more BWPs of the V-BWP can be activated, it can support a high data rate. In addition, it can avoid wastage of the radio resources by optimal resource allocation. Moreover it can prevent a BWP blockage issue which hinders scheduling of services.

At block 206 (optional), the network device 110 may transmit to the terminal device a message for activating or deactivating at least one of the two or more BWPs of the V-BWP. The message may be included in any suitable message or a dedicated message. For example, the message may be transmitted via a RRC message or a Media Access Control control-element (MAC CE). In an embodiment, a field of MAC CE may indicate an activation/deactivation mode. MAC CE may be quicker than RRC configuration and has hybrid automatic repeat request acknowledgement (HARQ-ACK) compared to Downlink Control Information (DCI) notification. The number of BWPs inside V-BWP to be activated or deactivated may be flexible and it is not limited to do it one by one, therefore overhead of control signaling of activation/deactivation may be reduced greatly. The network device such as gNB can do partial or completed activation/deactivation. For partial activation/deactivation mode: BWP identity (ID) may be indicated explicitly in the message such as MAC CE. For completed activation/deactivation mode: V-BWP ID may be indicated to UE, while BWP ID is not necessary. The partial or completed activation/deactivation may be based on practical demands. When V-BWP is set up for a UE firstly, the V-BWP may be activated before traffic scheduling.

In an embodiment, the deactivated BWP may follow: Physical Downlink Control Channel (PDCCH) may be not monitored by the UE; Channel State Information (CSI) may need measurement; and once the deactivation duration ends, UE may consider the BWP is resumed if no explicit notification that the BWP is still deactivated.

In an embodiment, the activation or deactivation of the at least one of the two or more BWPs within the V-BWP may be based on respective channel variance of the two or more BWPs, Channel State Information (CSI) report, control channel element (CCE) capacity, and/or data volume requirement of the terminal device. For example, the network device such as gNB may decide which BWP to be de-activated, which BWP to be activated, based on information, e.g. Channel State Information (CSI) report, control channel element (CCE) capacity, etc. The network device may activate the BWP with a higher channel quality and/or deactivate the BWP with a lower channel quality. As another example, when the data volume requirement of the terminal device is increasing, the network device may activate more BWPs within the V-BWP and vice versa. This embodiment can enable power savings via dynamic activation or deactivation of BWPs inside the V-BWP.

In an embodiment, the message for activating or deactivating at least one of the two or more BWPs of the V-BWP may include a duration of the activation or deactivation of the at least one of the two or more bandwidth parts determined by the network device. The network device determine the duration in various ways. For example, the network device determine the duration based on at least one of the service type, data volume requirement, channel quality of the terminal device.

In an embodiment, the terminal device does not monitor PDCCH of the deactivated BWP and monitors the PDCCHs of all the active BWPs inside the V-BWP. In this way, it may reduce complexity of the UE and/or improve energy efficiency of the UE.

In an embodiment, the terminal device's measurement density of the activated BWP, the deactivated BWP, and a candidate BWP outside the V-BWP may be set as different. The measurement may comprise any suitable radio link monitoring and measurement. The candidate BWP may be indicated to the UE in any suitable message such as the RRC message or MAC CE or a dedicated message. The measurement density may be predefined or determined by the network device. In the latter case, the network device may indicate the measurement density to the UE. For example, only a part of V-BWP may be is necessary to be activated for a UE monitoring and scheduling, measurement configuration as well, which can make the energy efficiency and reduce the complexity of UE. The BWP(s) inside the V-BWP not suitable for traffic could be deactivated temporarily, the UE does not monitor the PDCCH of this BWP and the measurement density for this BWP can be scaled as well.

In an embodiment, UE may be configured with a measurement BWP set, which may be split as dense set, sparse set and candidate set. The set type for each BWP inside V-BWP and the candidate BWP may be identified for example when the V-BWP is set up for the UE. For example, the active BWP(s) inside V-BWP may be in the dense set, the other BWP(s) inside V-BWP may be in the sparse set, and one or more BWPs outside V-BWP may in the candidate set. Each measurement set may have respective measurement parameter such as measurement period and/or start slot configuration, etc.

In an embodiment, control information of the two or more BWPs is transmitted/received in a selected active BWP inside the V-BWP. The control information may comprise any suitable control information such as scheduling information and/or channel state information and/or HARQ indicator. The network device or UE may select the active BWP inside the V-BWP for transmitting the control information in various ways. For example, the network device may select the BWP with the best channel quality inside the V-BWP which can take the responsibility of control information transmission (such as scheduling information) to UE for the other BWPs in the V-BWP. The UE may perform adaptive channel/resource selection for CSI/UCI (Uplink Control Information) report and the BWP with the best channel quality inside the V-BWP may be used by UE for control information transmission (such as CSI/UCI Uplink Control Information reporting) to the network device for the other BWPs inside the V-BWP. In this way, it can ensure the reliability of control information. Since no anchor role like primary cell is set inside V-BWP, each BWP in the V-BWP has the potential to take cross BWP scheduling. The network device and the UE can use any suitable approach to determine which BWP has the best channel quality. For example, for the TDD mode, the network device and the UE can utilize the channel reciprocity. In addition, the network device and the UE can utilize channel state report to estimate the channel quality of BWP. The network device may also indicate to the UE the BWP with the best channel quality.

For example, HARQ-ACK codebook determination may follow legacy including code block group (CBG)-based HARQ-ACK codebook determination, Type-1, Type-2 HARQ-ACK codebook determination. UCI reporting in physical uplink control channel may cover: physical uplink control channel (PUCCH) resource sets which is mainly to reuse legacy as defined as carrier specific instead of BWP level. What to be updated is PUCCH resources set needing extension for multi BWP HARQ-ACK or an integrated HARQ-ACK for whole V-BWP. Then the selection of resource sets may also be updated due to the HARQ bit size. For UE procedure for reporting HARQ-ACK: since V-BWP may comprise multiple BWPs and more than one BWP DL data transfer may need HARQ-ACK, which may introduce challenge due to PUCCH resource limitation if UE report HARQ-ACK for each BWP separately. In order to save PUCCH PRB (physical resource block) resource and improve the resource efficiency, all the HARQ-ACK bits may be combined and mapped to the same PUCCH resource rather than more PUCCH resource mapping. For UE procedure for reporting multiple UCI types: more than two HARQ-ACK bits may be defined due to V-BWP consisting more BWPs.

In an embodiment, when UE does not know the location of the control information from the network device, UE may detect the control information from all the active BWPs inside the V-BWP blindly. For example, the network device such as gNB can also select any of the active BWPs for control information transmission without DCI notification, UE may detect the control information from all the active BWPs inside the V-BWP blindly.

In an embodiment, each of the two or more BWPs inside the V-BWP may be associated with respective timer and when all timers of the two or more BWPs expire, the terminal device may be triggered to enter a default BWP.

In an embodiment, in order to fully adapt channel variance, no primary role and secondary role among the BWPs inside V-BWP, and the responsibility taken by each BWP depends on the channel quality, scheduling capacity, etc.

In an embodiment, in order to make the energy efficiency and reduce the complexity of UE, a part of V-BWP may be activated for a UE monitoring and scheduling, measurement configuration as well. The BWP(s) inside the V-BWP not suitable for traffic could be deactivated temporarily, the UE does not to monitor the PDCCH of this BWP, furthermore, the measurement density for this BWP can be scaled as well.

In an embodiment, since the V-BWP does not have anchor role, it is allowed to deactivate the whole V-BWP.

In an embodiment, the different measurement density may be defined for each type of BWP such as activated or deactivated BWP inside V-BWP and BWP outside V-BWP.

In an embodiment, the resource candidate from any BWP with best channel quality could be assigned to UE for CSI/UCI reporting.

In an embodiment, the BWP with best channel quality can take the responsibility of scheduling information transmission to UE for the other BWPs, which may be to ensure the reliability of control information. Since no anchor role like primary is set inside V-BWP, each BWP has the potential to take the cross scheduling.

In an embodiment, there is no limitation to select the BWPs for V-BWP. This may be UE specific action. And the BWPs inside V-BWP to be active may be decided by the network device such as gNB, no special limitation for the max number of active BWP.

In an embodiment, the behavior of Default BWP as defined by 3GPP specification may be followed and it is applied when BWP-InactivityTimer expires. Each BWP maintain this timer, and only when all of the BWPs inside V-BWP timeout, UE could be triggered to enter default BWP.

In an embodiment, the BWPs inside V-BWP could be activated/deactivated based on channel variance and data volume requirement of the UE, etc.

In an embodiment, V-BWP may be configured to a UE via a RRC message.

In an embodiment, MAC CE may be used for BWP activate/deactivate action.

In an embodiment, more than one V-BWP may be configured to a UE for traffic flow, which is based on UE capability. And UE may monitor the control information from all the deactivated BWPs inside the V-BWP.

In an embodiment, in general, all the BWPs inside V-BWP may be considered as equal. The BWP to be used for UE control plane is not static, which should be UE specific and channel quality or scheduling capacity dependent, no primary or secondary role is defined for V-BWP.

In an embodiment, DCI notification method in the legacy release of 3GPP can be reused to change BWP. But the network device such as gNB can also select any other BWPs inside the V-BWP without DCI notification, UE shall detect the control information from all the active BWPs blindly.

In an embodiment, UL and DL V-BWP can be configured and operated separately. And the BWPs inside V-BWP may be considered as active by default once the V-BPW is setup for the UE.

CE may be defined for this role, and the field of MAC CE may indicate the activation/deactivation mode:
Partly mode: the BWP ID may be indicated explicitly in MAC CE.
Completed mode: V-BWP ID may be indicated to UE, while BWP ID is not necessary.

The deactivation duration (such as Unit: 10 ms frame) should be indicated in MAC CE as well. The deactivated BWP could be resumed at any occasion decided by gNB, via MAC CE.

V-BWP Activation/Recovery Procedures

An IEs extension may be made to UE-EUTRA-Capability message as indication of UE capability to support LAA/LTE-U (Licensed Assisted Access/LTE-unlicensed). The UE-EUTRA-Capability message may be defined as

```
LAA-Parameters-r13 ::=              SEQUENCE {
    crossCarrierSchedulingLAA-DL-r13      ENUMERATED {supported}      OPTIONAL,
    csi-RS-DRS-RRM-MeasurementsLAA-r13 ENUMERATED {supported}         OPTIONAL,
    downlinkLAA-r13                       ENUMERATED {supported, LTE-U, bothLaaAndLteU}
    OPTIONAL,
    endingDwPTS-r13                       ENUMERATED {supported}      OPTIONAL,
    secondSlotStartingPosition-r13        ENUMERATED {supported}      OPTIONAL,
    tm9-LAA-r13                           ENUMERATED {supported}      OPTIONAL,
    tm10-LAA-r13                          ENUMERATED {supported}      OPTIONAL|
}
```

In an embodiment, the approach as defined in the legacy release of 3GPP that the DCI used to switch BWP may not be used for BWP aggregation.

In an embodiment, the number of BWPs inside V-BWP to be activated or deactivated is flexible, it is not limited to do it one by one, overhead of control signaling may be reduced greatly.

In an embodiment, V-BWP is set up for a UE firstly, then the V-BWP should be activated before traffic scheduling.

In an embodiment, the V-BWP activation can be done for the whole V-BWP or for some of the BWPs inside V-BWP. It may be decided based on practical demands.

In an embodiment, the V-BWP activation mode may comprise partly activation and completed activation.

In an embodiment, a new MAC CE may be defined to cover this activation purpose.

In an embodiment, since V-BWP may comprise multiple BWPs, and more than one BWPs DL data transfer may need HARQ-ACK, which introduce the challenge due to PUCCH resource limitation if UE report HARQ-ACK for each BWP separately. In order to save PUCCH PRB resource and improve the resource efficiency, all the HARQ-ACK bits may be combined and mapped to the same PUCCH resource rather than more PUCCH resource mapping.

In an embodiment, the best available BWP inside V-BWP could be selected for UCI reporting in PUSCH.

In an embodiment, in order to monitor the channel continuously and reduce the complexity, hierarchic measurement mechanism may be introduced. The UE may be configured with a measurement BWP set, which may be split as dense set, sparse set, candidate set.

In the following, we describe a specific example of V-BWP in 5G NR.

V-BWP Configuration/Setup Procedures

The initial access BWP may be used to trigger the V-BWP activation and deactivation. The initial access BWP may be put into the V-BWP by default. If no V-BWP is activated, then the UE may follow the behavior of legacy. The network device such as gNB can do partly activate/deactivate operation or completed activation/deactivation. Dedicated MAC Three types of downlinkLAA-r13: LAA (default), LTE-U and both LAA and LTE-U may be supported. The same IEs extension may be applied to eLAA (uplink).

V-BWP Monitoring

The UE may monitor the PDCCH control channel of all the active BWPs inside the V-BWP, instead of whole V-BWP, which will reduce complexity for UE, and. The network device such as gNB may decide which BWP(s) to be de-activated, which one to be activated, based on the information, e.g. CSI report, CCE capacity etc. The deactivated duration may be also decided by gNB. The network device such as gNB may use a new MAC CE to do deactivation for a UE.

The deactivated BWP should follow: PDCCH is not monitored by UE and CSI still needs measurement. Once the deactivation duration ends, UE may consider the BWP is resumed if no explicit notification that the BWP is still deactivated.

DCI may be sent per BWP, but cross BWP scheduling may be supported as well. All the BWP DCI for UL and DL respectively corresponds to the same C-RNTI.

Frequency hopping may follow legacy. Legacy frequency hopping covers: PT-RS frequency hopping; Demodulation reference signal for PUCCH format; Demodulation reference signal for PUCCH format; and SRS frequency hopping.

RS consideration may follow legacy.

Modulation & MCS (Modulation and Coding Scheme) may follow legacy.

PDCCH region and CCE mapping may follow legacy.

MIMO (Multiple Input Multiple Output) & precoding may follow legacy.

Waveform and Mixed Numerology

Baseline modulation scheme may be OFDM. Due to the SC BW (signal carrier bandwidth) difference between URLLC and eMBB, the unit of FFT (Fast Fourier Transform) size is not uniform now, e.g. 60 KHZ for URLLC, while 15 KHZ for eMBB, which means RE (resource element) size and amount are different for each traffic scenario. The FFT size can be determined separately. The network element such as gNB may support hybrid numerology, while UE only support the same numerology. In UE, V-BWP based FFT could be done instead of BWP based. The same numerology is prerequisite.

DC (Direct Current) subcarrier consideration: No explicit DC subcarrier is reserved both for downlink and uplink. Uniform DC for a V-BWP.

RADIO & RF (radio-frequency) receiver: Capability improvement such as Filter, Mixer and Power Amplifier is needed for both UE and gNB.

Multiplexing and channel coding: Uplink transport channels and control information may follow legacy for each BWP of V-BWP and downlink transport channels and control information may follow legacy for each BWP of V-BWP.

Contention based UL access—No-grant uplink: it may follow legacy for Resource allocation, still per BWP, instead of V-BWP. The configuration for UE could be combined in the same RRC message for the whole V-BWP.

Synchronization procedures: Cell search, transmission timing adjustments, and timing for secondary cell activation/deactivation may follow legacy.

Hierarchic & sparse CSI measurement: In order to monitor the channel continuously and reduce the complexity, hierarchic measurement mechanism is introduced here. UE is configured with a measurement BWP set, which is split as dense set, sparse set, candidate set. The set type for each BWP in V-BWP may be identified when the V-BWP is set up for the UE. The active BWP inside V-BWP should be in dense set. The other BWP inside V-BWP is in sparse set. The BWP outside V-BWP is in candidate set. Each measurement set has the corresponding measurement period, start slot configuration. It may also be applied to Radio link monitoring and measurement.

Uplink Power control: it may follow legacy. The UL power may be calculated at V-BWP level instead of single BWP. The total power of UE could be allocated among BWPs, which may be UE implementation dependent.

Random access procedure: Initial access may follow legacy. PDCCH order RA may follow legacy.

UE Procedure for Reporting Control Information:
HARQ-ACK codebook determination may Follow legacy including CBG (Code Block Group)-based HARQ-ACK codebook determination, Type-1, -2 HARQ-ACK codebook determination.
UCI reporting in physical uplink control channel will covers:
PUCCH Resource Sets: it mainly reuse legacy, defined as carrier specific instead of BWP level.
What to be updated is PUCCH resources set needs extension for multi BWP HARQ-ACK or an integrated HARQ-ACK for whole V-BWP.
Then the selection of resource sets shall also be updated due to the HARQ bit size.
UE procedure for reporting HARQ-ACK: Since V-BWP may consist of multiple BWP, and more than one BWPs DL data transfer need HARQ-ACK, which introduce the challenge due to PUCCH resource limitation if UE report HARQ-ACK for each BWP separately.
In order to save PUCCH PRB resource and improve the resource efficiency, all the HARQ-ACK bits are combined and mapped to the same PUCCH resource rather than more PUCCH resource mapping.
UE procedure for reporting SR may follow legacy.
UE procedure for reporting multiple UCI types: The case of more than two HARQ-ACK bits should be considered due to V-BWP consisting more BWPs.
UCI repetition procedure may follow legacy.
UCI reporting in physical uplink shared channel: UE try to select resource of the BWP with the best channel quality of a V-BWP to do UCI reporting.

UE procedure for receiving control information may follow legacy for determining physical downlink control channel assignment.

UE-group common signaling may follow legacy for Slot configuration, Discontinuous transmission indication, SRS (Sounding Reference Signal) switching.

Bandwidth part operation may follow legacy definition.

UE procedure for monitoring Type0-PDCCH common search space may follow legacy.

UE procedure for monitoring Type0-PDCCH common search space may follow legacy.

Power allocation for DL may follow legacy about EPRE definition.

Physical downlink shared channel related procedures: Resource allocation type may follow legacy, Physical resource block (PRB) bundling may follow legacy, MCS & TBS (Transport Block Size) may follow legacy, PDSCH resource mapping may follow legacy, and UE procedure for receiving downlink reference signals: Per BWP may follow legacy.

Physical downlink shared channel related procedures: UE procedure for reporting channel state information may follow legacy, but a new mechanism is introduced herein for measurement. UE PDSCH processing procedure time may follow legacy.

Physical Uplink Shared Channel Related Procedure:
UE procedure for transmitting the physical uplink shared channel: Resource allocation in time domain requires the slot configuration is common for all the BWPs inside the V-BWP.
UE reference symbol (RS) procedure may follow legacy.
UE PUSCH hopping procedure: Per BWP may follow legacy.
PUSCH timing capability: Extension may be necessary due to V-BWP level processing.
Physical layer measurements may follow legacy.
Medium Access Control (MAC) & Control Element
New MAC CE is to be defined.
The data transfer procedure may be followed as legacy.
V-BWP activation MAC CE
Action: activation, deactivation, recovery
Operation mode
Partly mode: the BWP ID should be indicated explicitly in MAC CE.
Completed mode: V-BWP ID should be indicated to UE, while BWP ID is not necessary.
Deactivation duration.
Unit: 10 ms frame
The deactivated BWP could be resumed at any occasion decided by gNB, via the MAC CE.
Radio link control (RLC) may follow legacy.
Packet Data Convergence Protocol (PDCP) may follow legacy.
Radio Resource Control (RRC): RRC for V-BWP setup may include measurement type identification for each BWP inside.

Figure 3:
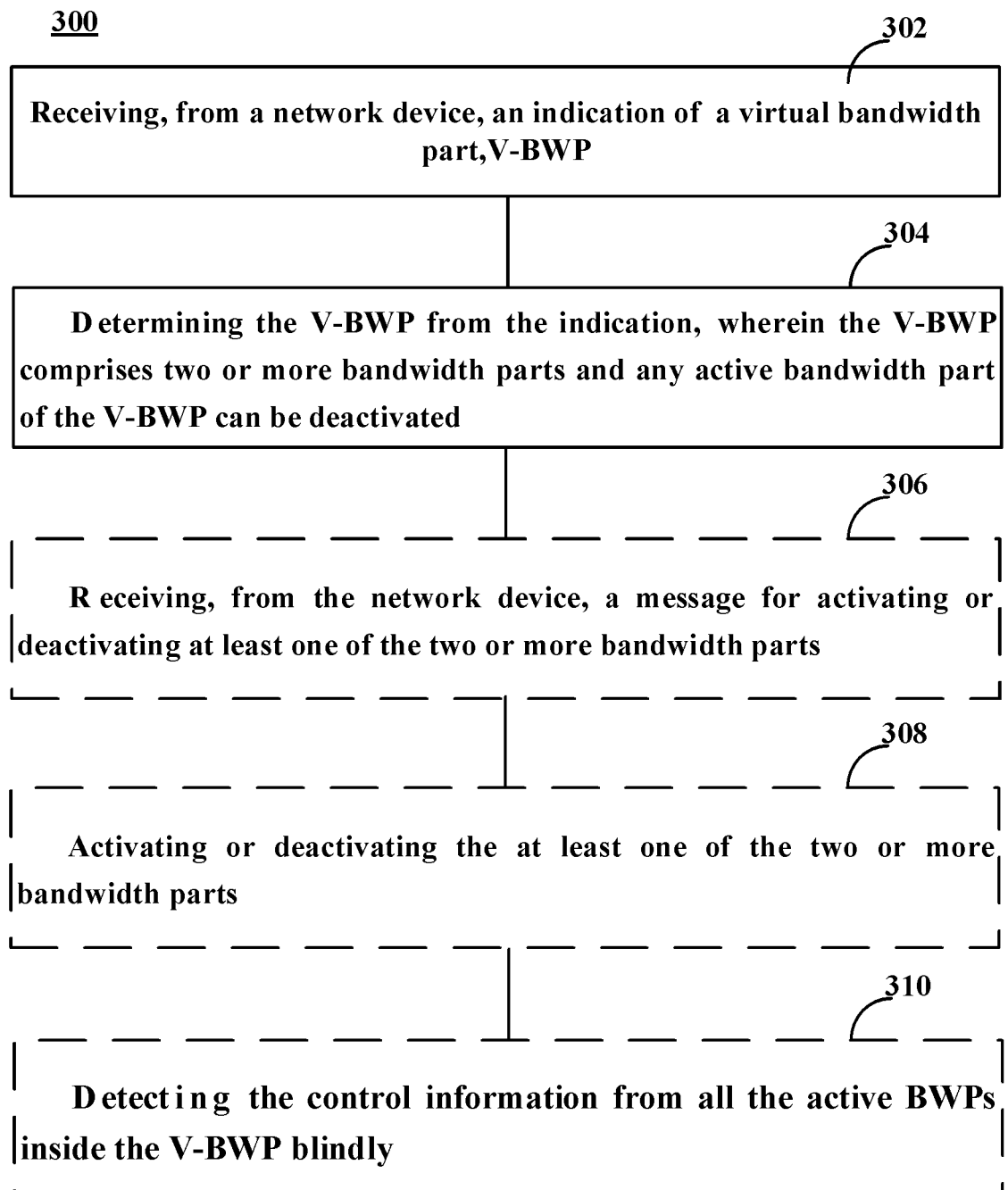
FIG. 3 is a flow chart depicting a method according to an embodiment of the present disclosure.

FIG. 3 is a flow chart depicting a method according to an embodiment of the present disclosure, which may be performed at an apparatus such as the terminal device 102 of FIG. 1. As such, the terminal device may provide means for accomplishing various parts of the method 300 as well as means for accomplishing other processes in conjunction with other components. For some parts which have been described in the above embodiments, detailed description thereof is omitted here for brevity.

As shown in FIG. 3, the method 300 may start at block 302 where the terminal device 102 may receive, from a network device, an indication of a virtual BWP (V-BWP). For example, the network device 110 may determine the V-BWP for a terminal device and then send the indication to the terminal device as described above. In an embodiment, the V-BWP may comprise two or more BWPs and any active BWP of the V-BWP can be deactivated. In an embodiment, the two or more BWPs may belong to a same cell.

In an embodiment, more than one V-BWP may be configured to a UE for traffic flow, which may be based on the UE's capability. For example, In a 5G system, it would be possible for a UE to access multiple services concurrently. The indication may be used to indicate more than one V-BWPs. The indication may be included in any suitable message or a dedicated message. In an embodiment, the indication may be transmitted via a radio resource control (RRC) message or MAC CE.

In an embodiment, an initial access BWP may be used to trigger the V-BWP activation and deactivation. The initial BWP may be put into the V-BWP by default. If no V-BWP is activated, then the network device and the terminal device may follow a legacy behavior.

In an embodiment, when the V-BWP is setup up for the terminal device, the BWPs inside the V-BWP may be active by default.

At block 304, the terminal device may determine the V-BWP from the indication. Then the terminal device may operate based on the configured V-BWP.

At block 306 (optional), the terminal device may receive, from the network device, a message for activating or deactivating at least one of the two or more BWPs. The message may be included in any suitable message or a dedicated message. For example, the message may be received via a RRC, message or a MAC CE or any other suitable message. In an embodiment, a field of MAC CE may indicate the activation/deactivation mode such as partial or completed activation/deactivation. MAC CE may be quicker than RRC configuration and has HARQ-ACK compared to DCI notification.

At block 308 (optional), the terminal device may activate or deactivate the at least one of the two or more bandwidth parts.

In an embodiment, the activation or deactivation of the at least one of the two or more BWPs within the V-BWP may be based on respective channel variance of the two or more BWPs, Channel State Information (CSI) report, control channel element (CCE) capacity, and/or data volume requirement of the terminal device.

In an embodiment, the message may include a duration of the activation or deactivation of the at least one of the two or more bandwidth parts determined by the network device.

In an embodiment, the terminal device does not monitor PDCCH of the deactivated BWP and monitors the PDCCHs of all the active BWPs inside the V-BWP. In this way, it may reduce complexity of the UE and/or improve energy efficiency of the UE.

In an embodiment, the terminal device's measurement density of the activated BWP, the deactivated BWP, and a candidate BWP outside the V-BWP is set as different as described above.

In an embodiment, UE may be configured with a measurement BWP set, which may be split as dense set, sparse set, candidate set as described above.

In an embodiment, control information of the two or more BWPs is transmitted/received in a selected active BWP of the V-BWP. The control information may comprise any suitable control information such as scheduling information and/or channel state information and/or HARQ indicator. The network device or UE may select the active BWP of the V-BWP for transmitting the control information in various ways as described above. The selected active bandwidth part may be the bandwidth part with the best channel quality.

In an embodiment, at block 310 (optional), the terminal device may detect the control information from all the active BWPs inside the V-BWP blindly. For example, the network device such as gNB can also select any of the active BWPs for control information transmission without DCI notification, UE may detect the control information from all the active BWPs inside the V-BWP blindly. It is noted that block 310 may be performed at any suitable point such as before/after block 306 or 308.

In an embodiment, each of the two or more BWPs may be associated with respective timer and when all timers of the two or more BWPs expire, the terminal device may be triggered to enter a default BWP.

In an embodiment, when the V-BWP is setup up for the terminal device, the bandwidth parts inside the V-BWP are active by default.

In an embodiment, the two or more bandwidth parts belongs to a same cell and/or the V-BWP comprises two or more bandwidth parts with a same numerology and/or cyclic prefix, CP, parameter.

Figure 4:
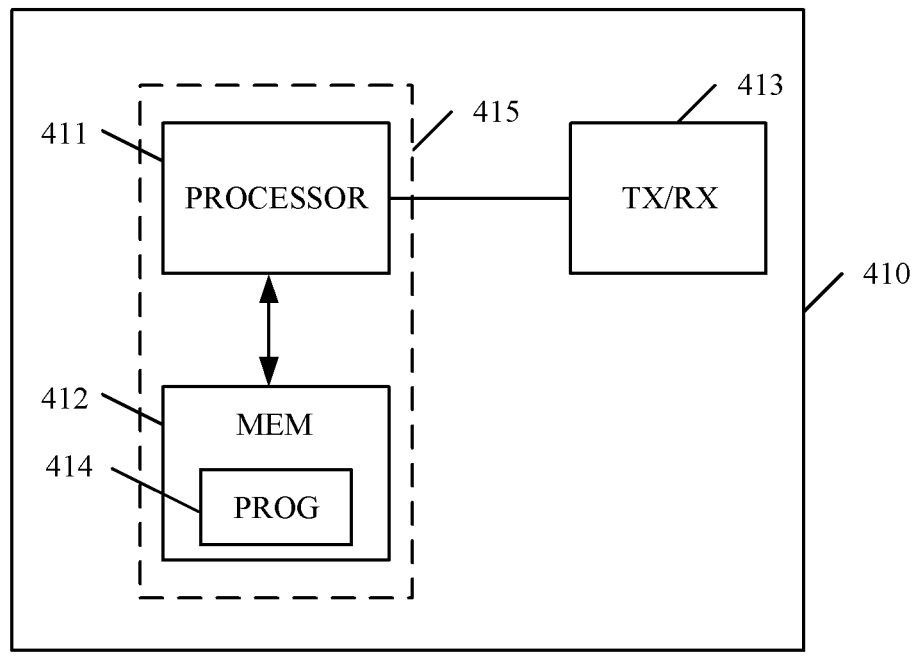
FIG. 4 illustrates a simplified block diagram of a network device in a wireless communication system according to an embodiment of the present disclosure.

FIG. 4 illustrates a simplified block diagram of a network device in a wireless communication system according to an embodiment of the present disclosure. The network device 400 may comprise at least one processor 411, such as a data processor (DP) and at least one memory (MEM) 412 coupled to the processor 411. The network device 400 may further comprise a transmitter TX and receiver RX 413 coupled to the processor 411. The MEM 412 stores a program (PROG) 414. The PROG 414 may include instructions that, when executed on the associated processor 411, enable the network device 400 to operate in accordance with the embodiments of the present disclosure, for example to perform the method 200. A combination of the at least one processor 411 and the at least one MEM 412 may form processing means 415 adapted to implement various embodiments of the present disclosure.

Figure 5:
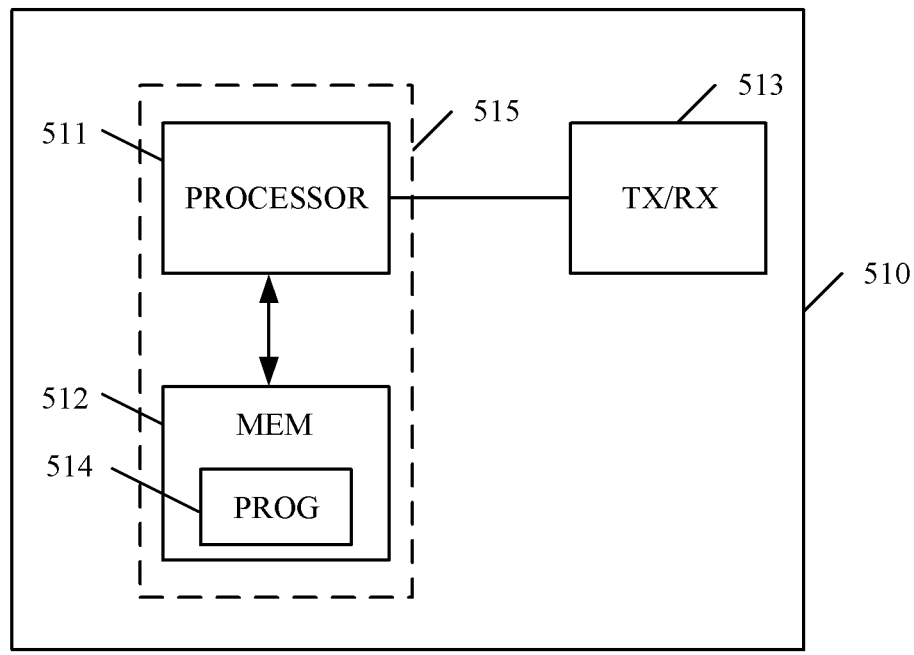
FIG. 5 illustrates a simplified block diagram of a terminal device of a wireless communication system according to an embodiment of the present disclosure.

FIG. 5 illustrates a simplified block diagram of a terminal device of a wireless communication system according to an embodiment of the present disclosure. The terminal device 500 comprises at least one processor 521, such as a DP, and at least one MEM 522 coupled to the processor 521. The terminal device 500 may further comprise a transmitter TX and receiver RX 523 coupled to the processor 521. The MEM 522 stores a PROG 524. The PROG 524 may include instructions that, when executed on the associated processor 521, enable the terminal device 500 to operate in accordance with the embodiments of the present disclosure, for example to perform the method 300. A combination of the at least one processor 521 and the at least one MEM 522 may form processing means 525 adapted to implement various embodiments of the present disclosure.

Various embodiments of the present disclosure may be implemented by computer program executable by one or more of the processors 411 and 521, software, firmware, hardware or in a combination thereof.

The MEMs 412 and 522 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 411 and 521 may be of any type suitable to the local technical environment, and may include one or more of general purpose computers, special purpose computers, microprocessors, digital signal processors DSPs and processors based on multicore processor architecture, as non-limiting examples.

Figure 6:
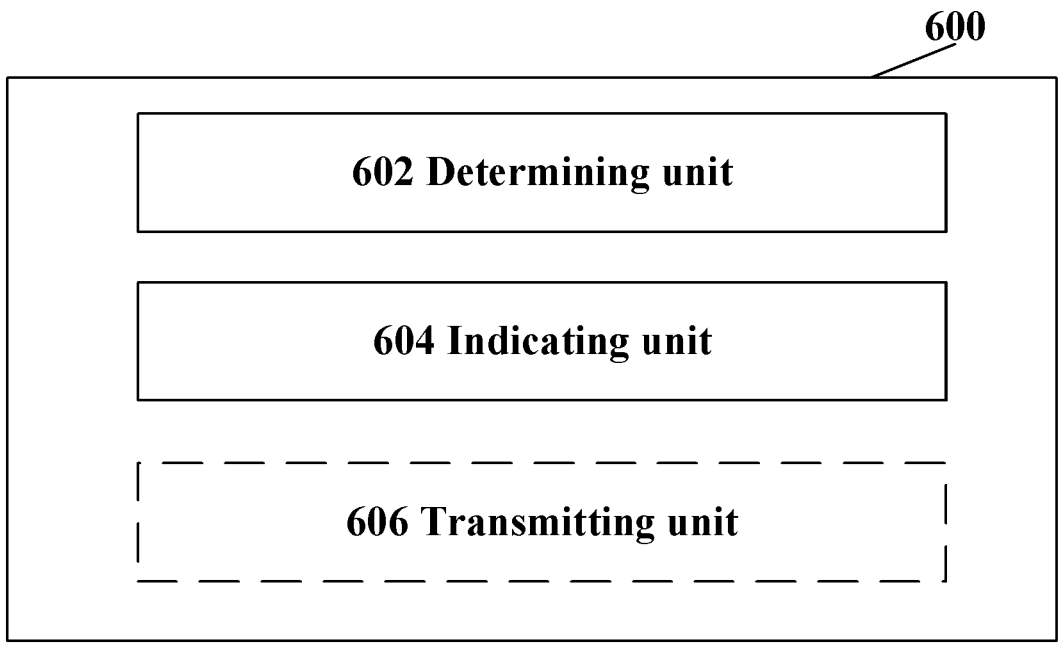
FIG. 6 illustrates a schematic block diagram of a network device of a wireless communication system according to an embodiment of the present disclosure.

Reference is now made to FIG. 6, which illustrates a schematic block diagram of a network device of a wireless communication system. The network device 600 is operable to carry out the exemplary method 200 described with reference to FIG. 2 and possibly any other processes or methods.

As shown in FIG. 6, the network device 600 may comprise a determining unit 602 configured to determine a virtual BWP, V-BWP, for a terminal device. The network device 600 may further comprise an indicating unit 604 configured to indicate the V-BWP to the terminal device. The V-BWP comprises two or more BWPs and any active BWP of the V-BWP can be deactivated.

In an embodiment, the network device 600 may comprise a transmitting unit (optional) 606 configured to transmit to the terminal device a message for activating or deactivating at least one of the two or more BWPs.

In an embodiment, the activation or deactivation of the at least one of the two or more BWPs is based on respective channel variance of the two or more bandwidth parts, Channel State Information, CSI, report, control channel element, CCE, capacity, and/or data volume requirement of the terminal device.

In an embodiment, the message includes a duration of the activation or deactivation of the at least one of the two or more bandwidth parts determined by the network device.

In an embodiment, the indication and/or the message is transmitted via at least one of a radio resource control, RRC, message, a Media Access Control control-element, MAC CE.

In an embodiment, the terminal device does not monitor PDCCH of the deactivated BWP. In an embodiment, the terminal device monitors Physical Downlink Control Channel, PDCCH, of all the activated bandwidth parts.

In an embodiment, the terminal device's measurement density of the activated BWP, the deactivated BWP, and a candidate BWP outside the V-BWP is set as different.

In an embodiment, control information of the two or more BWPs is transmitted/received in a selected active BWP of the V-BWP.

In an embodiment, the selected active BWP is the BWP with the best channel quality.

In an embodiment, the control information comprises scheduling information and/or channel state information and/or HARQ indicator.

In an embodiment, each of the two or more BWPs is associated with respective timer and when all timers of the two or more BWPs expire, the terminal device is triggered to enter a default BWP.

In an embodiment, when the V-BWP is setup up for the terminal device, the BWPs inside the V-BWP are active by default.

In an embodiment, the V-BWP comprises two or more BWPs with a same numerology and/or CP parameter.

In an embodiment, the two or more BWPs belongs to a same cell.

Figure 7:
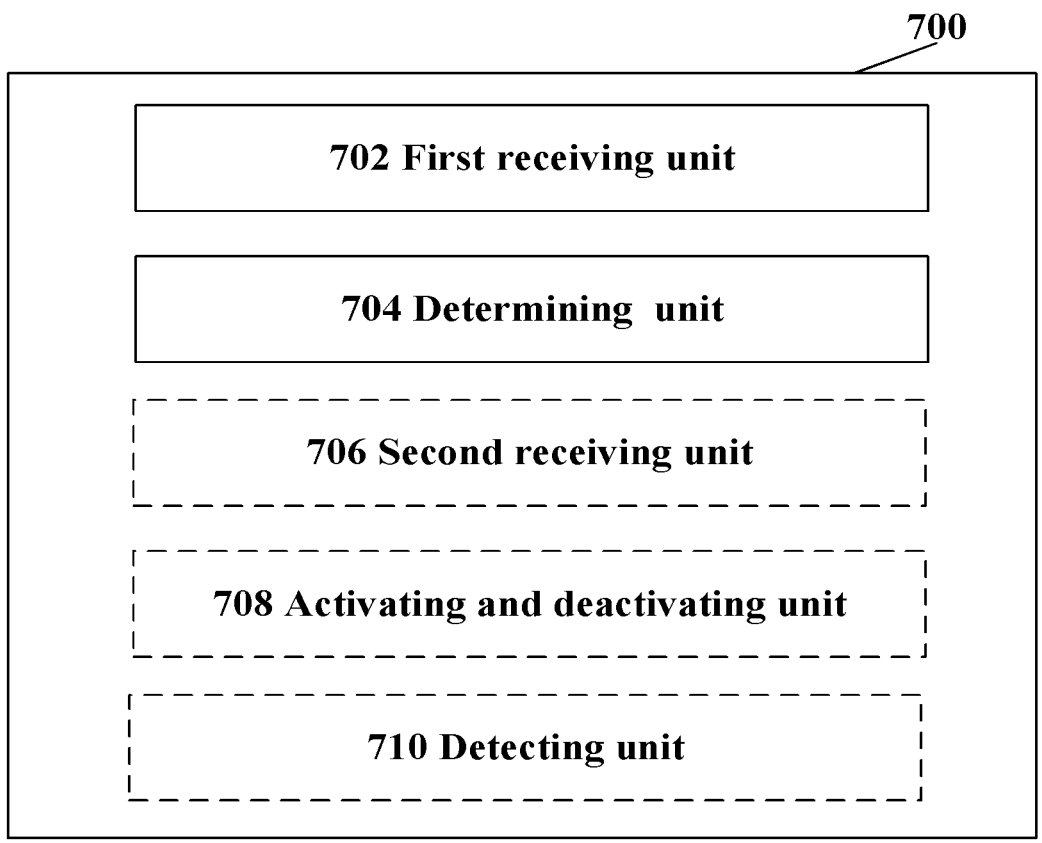
FIG. 7 illustrates a schematic block diagram of a terminal device of a wireless communication system according to an embodiment of the present disclosure.

Reference is now made to FIG. 7, which illustrates a schematic block diagram of a terminal device of a wireless communication system. The network device 700 is operable to carry out the exemplary method 300 described with reference to FIG. 3 and possibly any other processes or methods.

As shown in FIG. 7, the terminal device 700 may comprise a first receiving unit 702 configured to receive, from a network device, an indication of a virtual bandwidth part, V-BWP. The terminal device 700 may further comprise a determining unit 704 configured to determine the V-BWP from the indication.

In an embodiment, the terminal device 700 may comprise a second receiving unit (optional) 706 may further be configured to receive, from the network device, a message for activating or deactivating at least one of the two or more BWPs. The terminal device 700 may comprise an activating and deactivating unit 708 (optional) configured to activate or deactivate the at least one of the two or more BWPs.

In an embodiment, the activation or deactivation of the at least one of the two or more BWPs is based on respective channel variance of the two or more bandwidth parts, Channel State Information, CSI, report, control channel element, CCE, capacity, and/or data volume requirement of the terminal device.

In an embodiment, the message for activating or deactivating at least one of the two or more BWPs may include a duration of the activation or deactivation of the at least one of the two or more bandwidth parts determined by the network device.

In an embodiment, the indication and/or the message may be received via at least one of a radio resource control, RRC, message, a Media Access Control control-element, MAC CE.

In an embodiment, the terminal device does not monitor PDCCH of the deactivated BWP.

In an embodiment, the terminal device's measurement density of the activated BWP, the deactivated BWP, and a candidate BWP outside the V-BWP is set as different.

In an embodiment, control information of the two or more BWPs is transmitted/received in a selected active BWP of the V-BWP.

In an embodiment, the selected active BWP is the BWP with the best channel quality.

In an embodiment, the terminal device 700 may comprise a detecting unit 710 (optional) configured to detect control information of the two or more BWPs from all the active BWPs blindly.

In an embodiment, the control information comprises scheduling information and/or channel state information and/or HARQ indicator.

In an embodiment, each of the two or more BWPs is associated with respective timer and when all timers of the two or more BWPs expire, the terminal device is triggered to enter a default BWP.

In an embodiment, when the V-BWP is setup up for the terminal device, the BWPs inside the V-BWP are active by default.

In an embodiment, the two or more BWPs belongs to a same cell and/or the V-BWP comprises two or more BWPs with a same numerology and/or cyclic prefix, CP, parameter.

It would be appreciated that, some units or modules in the network device 600 and terminal device 700 can be combined in some implementations. For example, in one embodiment, it is possible to use a single transceiving unit to send and receive the information.

According to an aspect of the disclosure it is provided a computer program product being tangibly stored on a computer readable storage medium and including instructions which, when executed on at least one processor, cause the at least one processor to carry out the method related to the network device as described above, such as the method 200 and a part of method 200.

According to an aspect of the disclosure it is provided a computer program product being tangibly stored on a computer readable storage medium and including instructions which, when executed on at least one processor, cause the at least one processor to carry out the method related to the terminal device as described above, such as the method 300 and a part of method 300.

Figure 8:
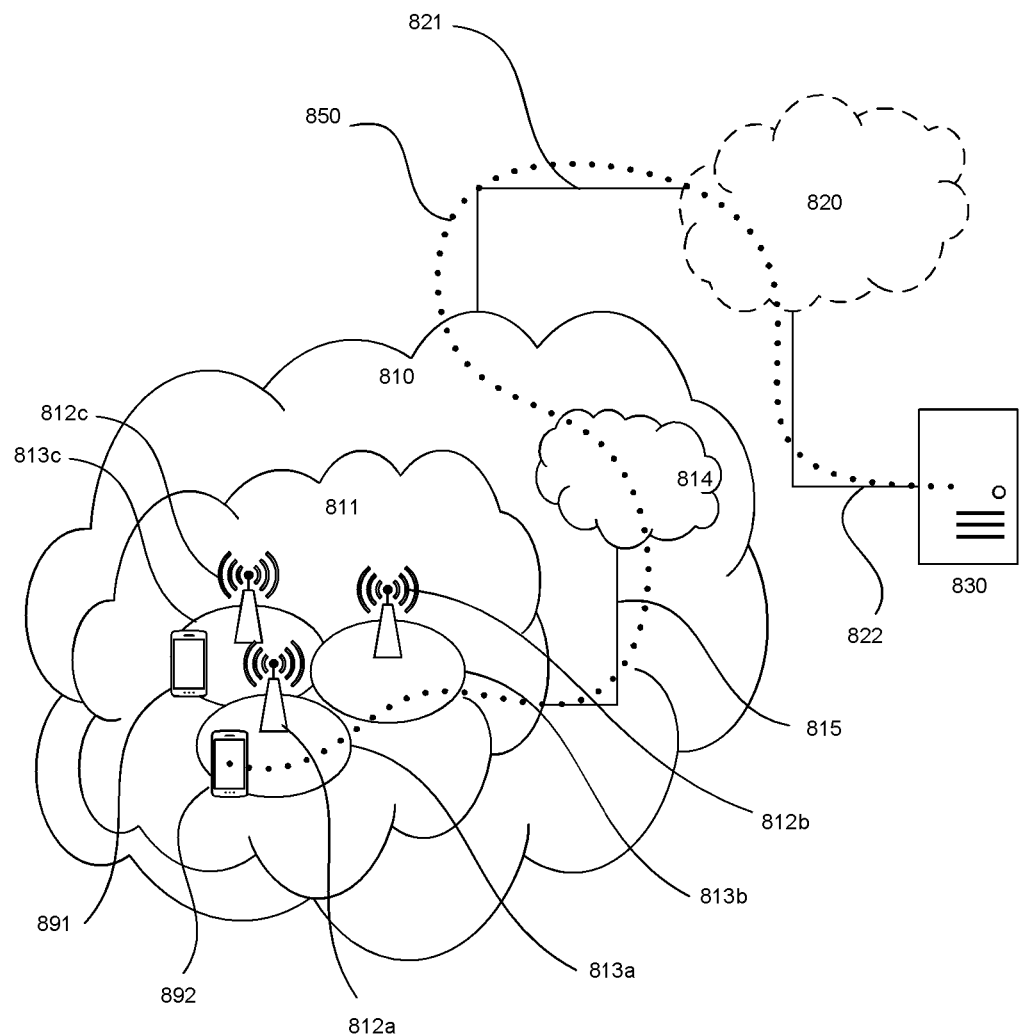
FIG. 8 is a block diagram illustrating a telecommunication network connected via an intermediate network to a host computer in accordance with some embodiments of the present disclosure.

With reference to FIG. 8, in accordance with an embodiment, a communication system includes telecommunication network 810, such as a 3GPP-type cellular network, which comprises access network 811, such as a radio access network, and core network 814. Access network 811 comprises a plurality of base stations 812*a*, 812*b*, 812*c*, such as NBs, eNBs, gNBs or other types of wireless access points, each defining a corresponding coverage area 813*a*, 813*b*, 813*c*. Each base station 812*a*, 812*b*, 812*c* is connectable to core network 814 over a wired or wireless connection 815. A first UE 891 located in coverage area 813*c* is configured to wirelessly connect to, or be paged by, the corresponding base station 812*c*. A second UE 892 in coverage area 813*a* is wirelessly connectable to the corresponding base station 812*a*. While a plurality of UEs 891, 892 are illustrated in this example, the disclosed embodiments are equally applicable to a situation where a sole UE is in the coverage area or where a sole UE is connecting to the corresponding base station 812.

Telecommunication network 810 is itself connected to host computer 830, which may be embodied in the hardware and/or software of a standalone server, a cloud-implemented server, a distributed server or as processing resources in a server farm. Host computer 830 may be under the ownership or control of a service provider, or may be operated by the service provider or on behalf of the service provider. Connections 821 and 822 between telecommunication network 813 and host computer 830 may extend directly from core network 814 to host computer 830 or may go via an optional intermediate network 820. Intermediate network 820 may be one of, or a combination of more than one of, a public, private or hosted network; intermediate network 820, if any, may be a backbone network or the Internet; in particular, intermediate network 820 may comprise two or more subnetworks (not shown).

The communication system of FIG. 8 as a whole enables connectivity between the connected UEs 891, 892 and host computer 830. The connectivity may be described as an over-the-top (OTT) connection 850. Host computer 830 and the connected UEs 891, 892 are configured to communicate data and/or signaling via OTT connection 850, using access network 811, core network 814, any intermediate network 820 and possible further infrastructure (not shown) as intermediaries. OTT connection 850 may be transparent in the sense that the participating communication devices through which OTT connection 850 passes are unaware of routing of uplink and downlink communications. For example, base station 812 may not or need not be informed about the past routing of an incoming downlink communication with data originating from host computer 830 to be forwarded (e.g., handed over) to a connected UE 891. Similarly, base station 812 need not be aware of the future routing of an outgoing uplink communication originating from the UE 891 towards the host computer 830.

Example implementations, in accordance with an embodiment, of the UE, base station and host computer discussed in the preceding paragraphs will now be described with reference to FIG. 9. In communication system 900, host computer 910 comprises hardware 915 including communication interface 916 configured to set up and maintain a wired or wireless connection with an interface of a different communication device of communication system 900. Host computer 910 further comprises processing circuitry 918, which may have storage and/or processing capabilities. In particular, processing circuitry 918 may comprise one or more programmable processors, application-specific integrated circuits, field programmable gate arrays or combinations of these (not shown) adapted to execute instructions. Host computer 910 further comprises software 911, which is stored in or accessible by host computer 910 and executable by processing circuitry 918. Software 911 includes host application 912. Host application 912 may be operable to provide a service to a remote user, such as UE 930 connecting via OTT connection 950 terminating at UE 930 and host computer 910. In providing the service to the remote user, host application 912 may provide user data which is transmitted using OTT connection 950.

Communication system 900 further includes base station 920 provided in a telecommunication system and comprising hardware 925 enabling it to communicate with host computer 910 and with UE 930. Hardware 925 may include communication interface 926 for setting up and maintaining a wired or wireless connection with an interface of a different communication device of communication system 900, as well as radio interface 927 for setting up and maintaining at least wireless connection 970 with UE 930 located in a coverage area (not shown in FIG. 9) served by base station 920. Communication interface 926 may be configured to facilitate connection 960 to host computer 910. Connection 960 may be direct or it may pass through a core network (not shown in FIG. 9) of the telecommunication system and/or through one or more intermediate networks outside the telecommunication system. In the embodiment shown, hardware 925 of base station 920 further includes processing circuitry 928, which may comprise one or more programmable processors, application-specific integrated circuits, field programmable gate arrays or combinations of these (not shown) adapted to execute instructions. Base station 920 further has software 921 stored internally or accessible via an external connection.

Communication system 900 further includes UE 930 already referred to. Its hardware 935 may include radio interface 937 configured to set up and maintain wireless connection 970 with a base station serving a coverage area in which UE 1230 is currently located. Hardware 935 of UE 930 further includes processing circuitry 938, which may comprise one or more programmable processors, application-specific integrated circuits, field programmable gate arrays or combinations of these (not shown) adapted to execute instructions. UE 930 further comprises software 931, which is stored in or accessible by UE 930 and executable by processing circuitry 938. Software 931 includes client application 932. Client application 932 may be operable to provide a service to a human or non-human user via UE 930, with the support of host computer 910. In host computer 910, an executing host application 912 may communicate with the executing client application 932 via OTT connection 950 terminating at UE 930 and host computer 910. In providing the service to the user, client application 932 may receive request data from host application 912 and provide user data in response to the request data. OTT connection 950 may transfer both the request data and the user data. Client application 932 may interact with the user to generate the user data that it provides.

Figure 9:
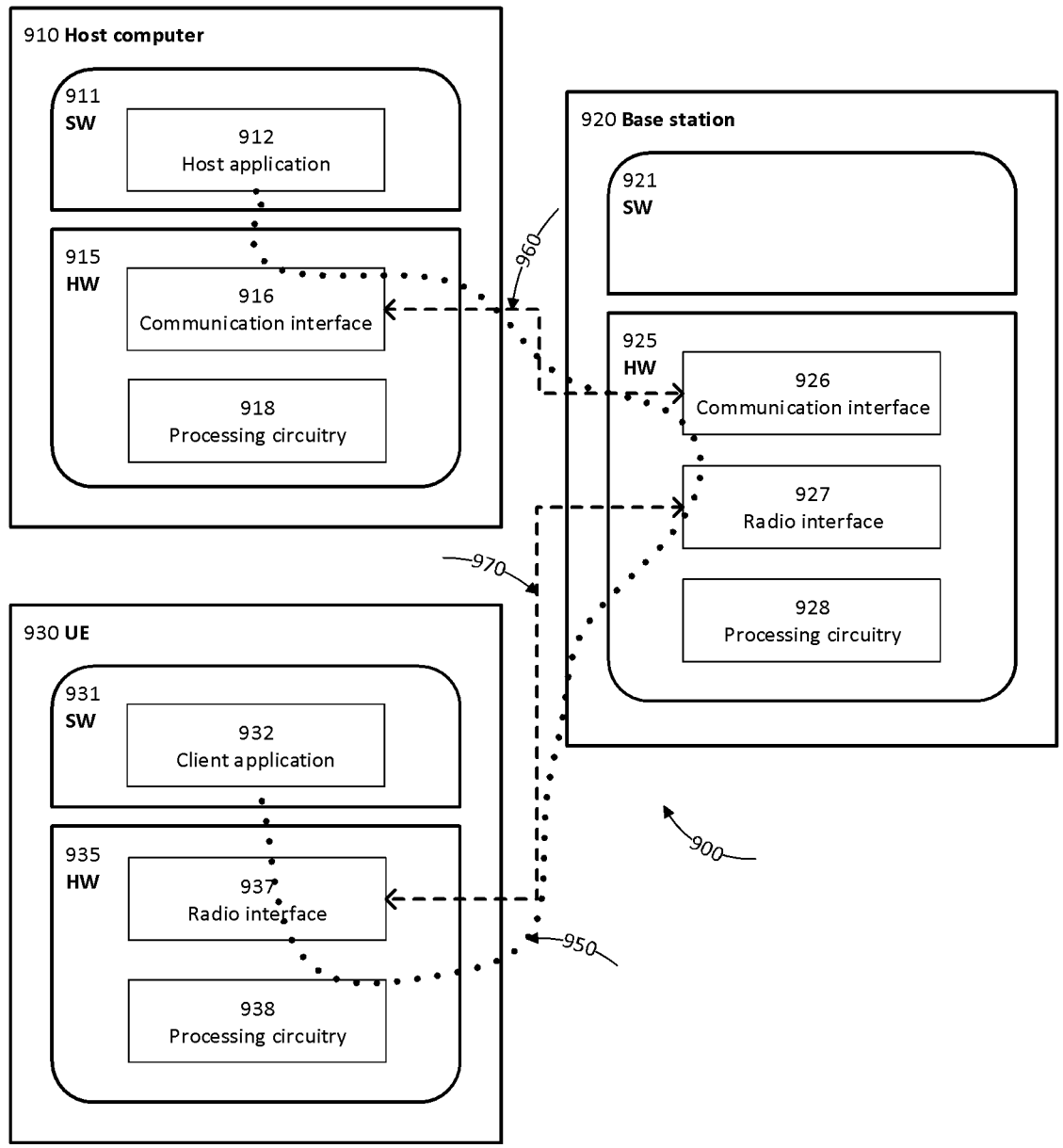
FIG. 9 is a block diagram illustrating a host computer communicating via a base station with a UE over a partially wireless connection in accordance with some embodiments of the present disclosure.

It is noted that host computer 910, base station 920 and UE 930 illustrated in FIG. 9 may be similar or identical to host computer 830, one of base stations 812a, 812b, 812c and one of UEs 891, 892 of FIG. 8, respectively. This is to say, the inner workings of these entities may be as shown in FIG. 9 and independently, the surrounding network topology may be that of FIG. 8.

In FIG. 9, OTT connection 950 has been drawn abstractly to illustrate the communication between host computer 910 and UE 930 via base station 920, without explicit reference to any intermediary devices and the precise routing of messages via these devices. Network infrastructure may determine the routing, which it may be configured to hide from UE 930 or from the service provider operating host computer 910, or both. While OTT connection 950 is active, the network infrastructure may further take decisions by which it dynamically changes the routing (e.g., on the basis of load balancing consideration or reconfiguration of the network).

Wireless connection 970 between UE 930 and base station 920 is in accordance with the teachings of the embodiments described throughout this disclosure. One or more of the various embodiments improve the performance of OTT services provided to UE 930 using OTT connection 950, in which wireless connection 970 forms the last segment. More precisely, the teachings of these embodiments may improve the efficiency of the uplink scheduling and reduce the uplink transmission delay, and thereby provide benefits such as high transmission quality and reduced user waiting time.

A measurement procedure may be provided for the purpose of monitoring data rate, latency and other factors on which the one or more embodiments improve. There may further be an optional network functionality for reconfiguring OTT connection 950 between host computer 910 and UE 930, in response to variations in the measurement results. The measurement procedure and/or the network functionality for reconfiguring OTT connection 950 may be implemented in software 911 and hardware 915 of host computer 910 or in software 931 and hardware 935 of UE 930, or both. In embodiments, sensors (not shown) may be deployed in or in association with communication devices through which OTT connection 950 passes; the sensors may participate in the measurement procedure by supplying values of the monitored quantities exemplified above, or supplying values of other physical quantities from which software 911, 931 may compute or estimate the monitored quantities. The reconfiguring of OTT connection 950 may include message format, retransmission settings, preferred routing etc.; the reconfiguring need not affect base station 920, and it may be unknown or imperceptible to base station 920. Such procedures and functionalities may be known and practiced in the art. In certain embodiments, measurements may involve proprietary UE signaling facilitating host computer 910's measurements of throughput, propagation times, latency and the like. The measurements may be implemented in that software 911 and 931 causes messages to be transmitted, in particular empty or 'dummy' messages, using OTT connection 950 while it monitors propagation times, errors etc.

Figure 10:
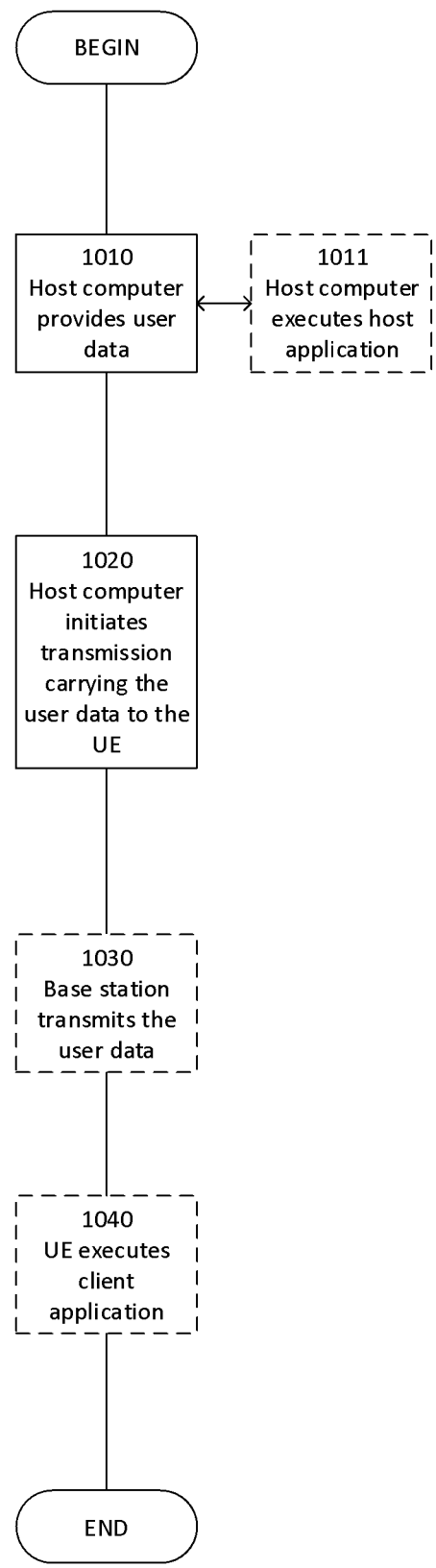
FIG. 10 is a flowchart illustrating a method implemented in a communication system, in accordance with an embodiment of the present disclosure.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In block 1010, the host computer provides user data. In sub-block 1011 (which may be optional) of block 1010, the host computer provides the user data by executing a host application. In block 1020, the host computer initiates a transmission carrying the user data to the UE. In block 1030 (which may be optional), the base station transmits to the UE the user data which was carried in the transmission that the host computer initiated, in accordance with the teachings of the embodiments described throughout this disclosure. In block 1040 (which may also be optional), the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In block 1010 of the method, the host computer provides user data. In an optional sub-block (not shown) the host computer provides the user data by executing a host application. In block 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
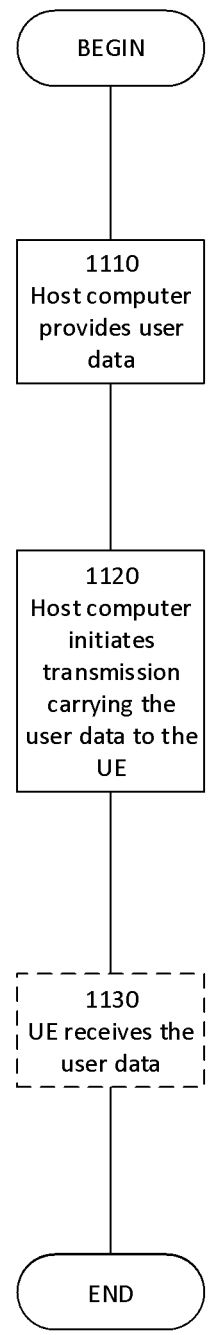
FIG. 11 is a flowchart illustrating a method implemented in a communication system, in accordance with an embodiment of the present disclosure.
Figure 12:
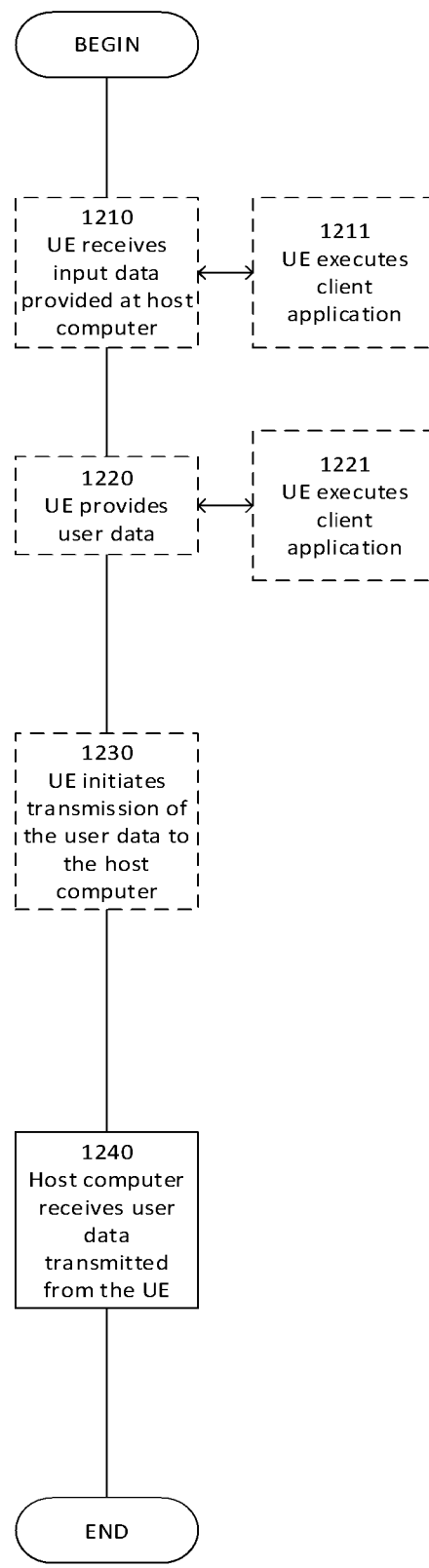
FIG. 12 is a flowchart illustrating a method implemented in a communication system, in accordance with an embodiment of the present disclosure.
Figure 13:
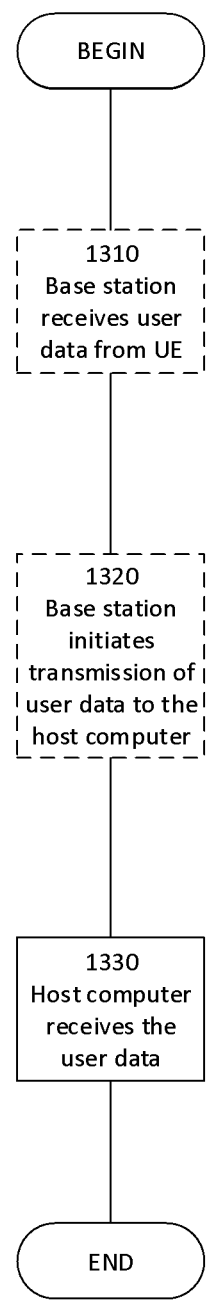
FIG. 13 is a flowchart illustrating a method implemented in a communication system, in accordance with an embodiment of the present disclosure.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In block 1110 (which may be optional), the UE receives input data provided by the host computer. Additionally or alternatively, in block 1120, the UE provides user data. In sub-block 1121 (which may be optional) of block 1120, the UE provides the user data by executing a client application. In sub-block 1111 (which may be optional) of block 1110, the UE executes a client application which provides the user data in reaction to the received input data provided by the host computer. In providing the user data, the executed client application may further consider user input received from the user. Regardless of the specific manner in which the user data was provided, the UE initiates, in sub-block 1130 (which may be optional), transmission of the user data to the host computer. In block 1140 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In block 1110 (which may be optional), in accordance with the teachings of the embodiments described throughout this disclosure, the base station receives user data from the UE. In block 1120 (which may be optional), the base station initiates transmission of the received user data to the host computer. In block 1130

(which may be optional), the host computer receives the user data carried in the transmission initiated by the base station.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

The invention claimed is:

1. A method implemented in a network device of a wireless communication system, comprising:
   determining a virtual bandwidth part, V-BWP, for a terminal device;
   indicating the V-BWP to the terminal device, the V-BWP including two or more bandwidth parts, and any active bandwidth part of the V-BWP can be deactivated; and
   transmitting to the terminal device a message for activating or deactivating at least one of the two or more bandwidth parts, the message including a duration of the activation or deactivation of the at least one of the two or more bandwidth parts determined by the network device.

2. The method according to claim 1, wherein the activation or deactivation of the at least one of the two or more bandwidth parts is based on respective channel variance of the two or more bandwidth parts, Channel State Information, CSI, report, control channel element, CCE, capacity, and/or data volume requirement of the terminal device.

3. A method implemented in a terminal device of a wireless communication system, comprising:
   receiving, from a network device, an indication of a virtual bandwidth part, V-BWP;
   determining the V-BWP from the indication, the V-BWP including two or more bandwidth parts, and any active bandwidth part of the V-BWP can be deactivated;
   receiving, from the network device, a message for activating or deactivating at least one of the two or more bandwidth parts, the message including a duration of the activation or deactivation of the at least one of the two or more bandwidth parts determined by the network device; and
   activating or deactivating the at least one of the two or more bandwidth parts.

4. The method according to claim 3, wherein the activation or deactivation of the at least one of the two or more bandwidth parts is based on respective channel variance of the two or more bandwidth parts, Channel State Information, CSI, report, control channel element, CCE, capacity, and/or data volume requirement of the terminal device.

5. The method according to claim 3, wherein the indication and/or the message is received via at least one of a radio resource control, RRC, message, and a Media Access Control control-element, MAC CE.

6. The method according to claim 3, wherein the terminal device monitors Physical Downlink Control Channel, PDCCH, of all the activated bandwidth parts.

7. The method according to claim 3, wherein the terminal device's measurement density of the activated bandwidth part, the deactivated bandwidth part, and a candidate bandwidth part outside the V-BWP is set as different.

8. The method according to claim 3, wherein control information of the two or more bandwidth parts is transmitted/received in a selected active bandwidth part of the V-BWP.

9. The method according to claim 8, wherein the selected active bandwidth part is the bandwidth part with the best channel quality.

10. The method according to claim 3, further comprising: detecting control information of the two or more bandwidth parts from all the active bandwidth parts blindly.

11. The method according to claim 8, wherein the control information comprises scheduling information and/or channel state information and/or hybrid automatic repeat request, HARQ, indicator.

12. The method according to claim 3, wherein each of the two or more bandwidth parts is associated with respective timer and when all timers of the two or more bandwidth parts expire, the terminal device is triggered to enter a default bandwidth part.

13. The method according to claim 3, wherein when the V-BWP is setup for the terminal device, the bandwidth parts inside the V-BWP are active by default.

14. The method according to claim 3, wherein the two or more bandwidth parts belongs to a same cell and/or the V-BWP comprises two or more bandwidth parts with a same numerology and/or cyclic prefix, CP, parameter.

15. A network device of a wireless communication system, comprising:
a processor; and
a memory, the memory containing instructions executable by the processor, whereby the network device is operative to:
determine a virtual bandwidth part, V-BWP, for a terminal device;
indicate the V-BWP to the terminal device, the V-BWP including two or more bandwidth parts, and any active bandwidth part of the V-BWP can be deactivated; and
transmit to the terminal device a message for activating or deactivating at least one of the two or more bandwidth parts, the message including a duration of the activation or deactivation of the at least one of the two or more bandwidth parts determined by the network device.

16. A terminal device of a wireless communication system, comprising:
a processor; and
a memory, the memory containing instructions executable by the processor, whereby the terminal device is operative to:
receive, from a network device, an indication of a virtual bandwidth part, V-BWP; and
determine the V-BWP from the indication, the V-BWP including two or more bandwidth parts, and any active bandwidth part of the V-BWP can be deactivated;
receive, from the network device, a message for activating or deactivating at least one of the two or more bandwidth parts, the message including a duration of the activation or deactivation of the at least one of the two or more bandwidth parts determined by the network device; and
activate or deactivate the at least one of the two or more bandwidth parts.

* * * * *